(12) United States Patent
Jin

(10) Patent No.: US 7,450,550 B2
(45) Date of Patent: Nov. 11, 2008

(54) APPARATUS AND METHOD FOR ENHANCING TRANSFER RATE USING A DIRECT LINK PROTOCOL (DLP) AND MULTIPLE CHANNELS IN A WIRELESS LOCAL AREA NETWORK (LAN) USING A DISTRIBUTED COORDINATION FUNCTION (DCF)

(75) Inventor: Ho Jin, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 817 days.

(21) Appl. No.: 10/849,896

(22) Filed: May 21, 2004

(65) Prior Publication Data

US 2004/0264504 A1 Dec. 30, 2004

(30) Foreign Application Priority Data

Jun. 24, 2003 (KR) .................... 10-2003-0041104

(51) Int. Cl.
*H04Q 7/24* (2006.01)
(52) U.S. Cl. .................................................. 370/338
(58) Field of Classification Search ............... None
See application file for complete search history.

(56) References Cited

U.S. PATENT DOCUMENTS

| 5,787,076 A | 7/1998 | Anderson et al. |
| 6,292,475 B1 | 9/2001 | Swail |
| 6,393,261 B1 | 5/2002 | Lewis |
| 6,791,962 B2 * | 9/2004 | Wentink ................ 370/338 |
| 7,251,235 B2 * | 7/2007 | Wentink ................ 370/338 |

FOREIGN PATENT DOCUMENTS

| GB | 2 292 868 A | 3/1996 |
| GB | 2 308 956 A | 7/1997 |
| JP | 9-37345 A | 2/1997 |
| JP | 2004-260258 A | 9/2004 |
| WO | WO 01/15387 A1 | 3/2001 |

OTHER PUBLICATIONS

Wentink, Direct Stream Request Protocol (DSRP), IEEE, pp. 1-16, Jul. 2002.*
Kitchin, Wireless Address Resolution Protocol, IEEE, pp. 1-13, Jan. 2002.*
Kandala et al, Direct Link Protocol Specification, IEEE, pp. 1-4, Jul. 2002.*
Diepstraten et al, WiSP Wireless Sidelink Protocol, IEEE, pp. 1-12, Jul. 2002.*

* cited by examiner

*Primary Examiner*—Frank Duong
(74) *Attorney, Agent, or Firm*—Sughrue Mion, PLLC

(57) ABSTRACT

An apparatus and a method for presenting a novel format of a media access control (MAC) frame that enables the use of a direct link protocol (DLP) and multiple channels, thereby reducing contention among stations, and enhancing a transfer rate by using the MAC frame format in infrastructure-based wireless communications. A DLP station of the present invention includes a channel-switching module for switching a channel by writing a new channel number in a DLP request frame; a mode-switching module for switching a DLP mode by writing a new mode number in the DLP request frame; and a MAC frame-generating module for generating various MAC frames including the DLP request frame.

8 Claims, 9 Drawing Sheets

APPARATUS AND METHOD FOR ENHANCING TRANSFER RATE USING A DIRECT LINK PROTOCOL (DLP) AND MULTIPLE CHANNELS IN A WIRELESS LOCAL AREA NETWORK (LAN) USING A DISTRIBUTED COORDINATION FUNCTION (DCF)

BACKGROUND OF THE INVENTION

This application claims foreign priority under 35 USC § 119 to Korean Patent Application No. 10-2003-0041104 filed on Jun. 24, 2003, the disclosure of which is incorporated herein by reference.

1. Field of the Invention

The present invention relates to an apparatus and a method for enhancing a transfer rate in a wireless local area network (LAN) using a distributed coordination function (DCF). More particularly, the present invention relates to an apparatus and a method for presenting a novel format of a media access control (MAC) frame that enables the use of a direct link protocol (DLP) and multiple channels, thereby reducing contention among stations, and enhancing a transfer rate by using the MAC frame format in infrastructure-based wireless communications.

2. Description of the Related Art

As networks are increasingly being constructed in a wireless manner, and requests for the transfer of large volume of multimedia data continue to rise, there is a need for studies on methods for effective transfer in wireless LANs. There are two methods for improving the performance of wireless LANs with regard to the transfer of various multimedia data. The first method is a method of securing the quality of service (QoS) in a MAC level in order to effectively transmit data within a given period of time over conventional wireless LAN schemes in which a plurality of stations share a single channel. At present, an IEEE 802.11e group makes an effort to unify standards for improving QoS. The second method is a method of increasing bandwidth by allowing stations to acquire physical channels using multiple channels rather than a single channel in a basic service set (BSS).

A conventional transfer method in a wireless LAN employs a carrier sense multiple access with collision avoidance (CSMA/CA) protocol in which a plurality of stations share a single channel to perform transmission. If a BSS is established after the scan and join processes, the stations check whether they are participating in the same BBS when communications are made among them, using service set identifiers (SSIDs) and basic service set identifiers (BSSIDs). Before transmitting frames, the stations check whether a channel is idle by means of two methods depending on CSMA/CA. A method of checking channel conditions determines whether a channel is busy or idle by checking a received signal strength indication (RSSI) value of the channel that is physically used. Furthermore, there is a method of sensing a virtual carrier which determines the time when the stations use the channel by using a network allocation vector (NAV). In such a CSMA/CA contention method, since a single channel is shared, channel conditions are determined using physical carrier sensing (CCA indication) or virtual carrier sensing (NAV) so as to avoid collisions.

As shown in FIG. 1, a sending station STA1 210 sends a RTS (Request To Send) frame 211 to a receiving station STA2 220 present in the same BSS before transferring data 212 to STA2 220, in order to determine whether STA2 220 can receive the data 212. STA2 220 sends a CTS (clear to send) frame 221, i.e. a control frame, which notifies STA1 210 that STA2 220 can receive the data 212 and allows STA1 210 to transfer the data 212. STA1 210 then sends the data 212. In this process, NAVs are set up in the remaining stations, including STA3 230, but not including STA1 210 and STA2 220 present in the same BSS. STA3 230 considers the communication channel to be busy during NAV periods 231 and 232, thus no data is sent.

In CSMA/CA protocol wherein a single channel should be shared, there have been conducted various studies to secure transmission within a given period of time, i.e. to improve QoS, to thereby overcome limitations on bandwidth. A DLP is used when a point to point (P2P) network is required among the stations included in the BSS. DLP is a protocol that was proposed by the 802.11e standard in order to overcome problems occurring due to the sharing of a single channel and to improve QoS. Since data can be directly transmitted without passing through an access point (AP) if the DLP is used, it is possible to reduce a propagation delay and the total number of transmission times. Moreover, as there is no need for a MAC processing time in an AP, the use of the DLP has an advantage in that a greater amount of data can be transmitted within a given period of time.

The process of setting up a DLP according to the configuration of the DLP shown in FIG. 2 will be described. QSTA-1 210 that is a DLP requester sends a DLP request frame to an AP 250 (1a). At this time, the DLP request frame contains information on a data transfer rate, the capabilities of the station, and the like. Next, the AP simply forwards the DLP request frame to QSTA-2 220 that is a receiving station (1b). QSTA-2 220 confirms the DLP request frame received from the AP 250, and then transmits a DLP response frame, which contains information on whether to participate in a direct link 240, to the AP 250 (2a). The DLP response frame contains a status code for informing the results of the DLP request, a data transfer rate, the capabilities of the station, and the like. Finally, the AP 250 simply forwards the DLP response frame to QSTA-1 210 (2b). A series of such four processes is called a 4-handshake process of the DLP. For reference, the structures of the DLP request frame and the DLP response frame in the related art are shown in FIG. 3.

In conventional techniques by which a plurality of stations share a single channel, a point at issue is how the plurality of stations share the maximum transfer rate of the single channel (e.g., 54 Mbps in case of 802.11a). There have been developed many MAC algorithms in view of QoS so as to transfer data within a given period of time. DLP is one of these methods, which directly transfers data through a direct link without passing through an AP under the condition that P2P communications should be made after the DLP is set up. However, even though DLP is used, it is difficult to make use of the advantages of the direct link if contention is increased due to the presence of many stations in a BSS. Therefore, a method that enables efficient communications while making use of the advantages of DLP even when there is the presence of a plurality of the stations in a wireless LAN, is required.

SUMMARY OF THE INVENTION

The present invention is conceived to solve the aforementioned problems. An object of the present invention is to provide an apparatus and a method for enhancing a transfer rate by using the DLP of an independent channel without passing through an AP upon P2P transmission in an infrastructure mode and for obtaining maximum throughput of a wireless LAN in an environment having the least contention.

Another object of the present invention is to provide an apparatus and a method capable of reducing contention among stations in such a manner that switching to various modes adequate for wireless communication conditions can be made while keeping compatibility with the stations using a DCF based on an existing CSMA/CA in a wireless mobile environment in an infrastructure mode.

According to one aspect of the present invention for achieving the object, there is provided a DLP station, including a channel-switching module for switching a channel by writing a new channel number in a DLP request frame; a mode-switching module for switching a DLP mode by writing a new mode number in the DLP request frame; and a MAC frame-generating module for generating various MAC frames including the DLP request frame.

According to another aspect of the present invention, there is provided an access point, comprising a channel list-managing module for managing and distributing a list of available channels through periodical analysis of channel conditions; a channel number-writing module for checking whether there is an available DLP channel from the channel list and writing an available channel in a DLP request frame; and a point coordinator module for performing buffering and management of a frame that is required to be sent to sleeping stations, if any.

According to a further aspect of the present invention, there is provided a wireless network system for enhancing throughput using a DLP and multiple channels, including a plurality of DLP stations and an access point, wherein each of the plurality of DLP stations comprises a channel-switching module for switching a channel by writing a new channel number in a DLP request frame; a mode-switching module for switching a DLP mode by writing a new mode number in the DLP request frame; and a MAC frame-generating module for generating various MAC frames including the DLP request frame.

According to a still further aspect of the present invention, there is provided a method of enhancing throughput using a DLP and multiple channels, comprising a first step of performing an improved 4-handshake process, and a second step of performing a relevant mode according to a DLP channel mode and a channel number that have been determined through the 4-handshake process. The first step includes the steps of transmitting by a sending station, a DLP request frame to an AP; writing, by the AP, an available channel number in the DLP request frame; forwarding, by the AP, the DLP request frame to a receiving station; transmitting, by the receiving station, a DLP response frame to the AP; and forwarding, by the AP, the DLP response frame to the sending station.

According to a still further aspect of the present invention, there is provided a wireless network communication method using an access point in an infrastructure mode, including the steps of causing given stations to contend with one another for a channel in a DCF period; if a station that has won the contention is a station that requires DLP communications, allocating one available channel in a predetermined channel list to support the DLP communications; and causing given stations except DLP stations to which the DLP channel is allocated to contend with one another through a primary channel.

According to a still further aspect of the present invention, there is provided a wireless network communication method using an access point in an infrastructure mode, including the steps of causing given stations to contend with one another for a channel in a DCF period; if a station that has won the contention is a station that requires DLP communications, allocating one available channel in a predetermined channel list to support the DLP communications; setting up a NAV value that is communication time of DLP stations to which the DLP channel is allocated; and causing the DLP channel and given stations to contend with one another through a primary channel after the time corresponding to the NAV value has passed.

According to a still further aspect of the present invention, there is provided a wireless network communication method using an access point in an infrastructure mode, including the steps of allocating one available channel in a predetermined channel list between stations that require DLP communications in order to support the DLP communication; causing stations except DLP stations to which the DLP channel is allocated to contend with one another through a primary channel; if the communications between the stations to which the DLP channel is allocated are completed, informing stations except the stations to which the DLP channel is allocated of the end of the DLP communications; and after the end of the DLP communications is informed, causing the DLP stations and given stations to again contend with one another through the primary channel.

BRIEF DESCRIPTION OF THE DRAWINGS

The above and other objects, features and advantages of the present invention will become apparent from the following description of exemplary embodiments given in conjunction with the accompanying drawings, in which.

DETAILED DESCRIPTION OF THE INVENTION

Hereinafter, exemplary embodiments of the present invention will be described in detail with reference to the accompanying drawings.

Figure 4:
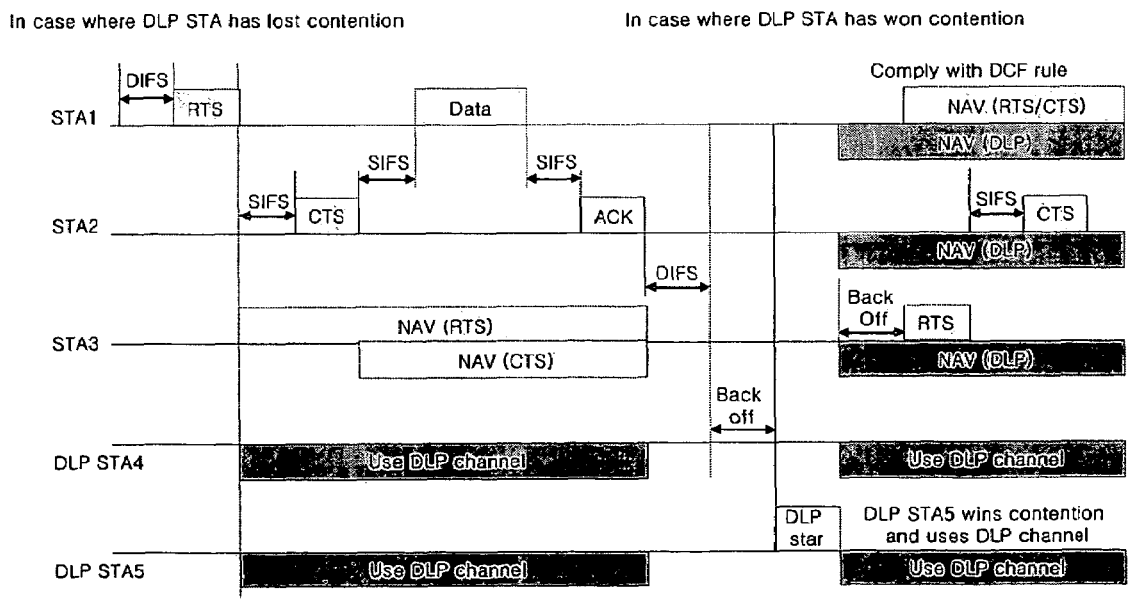
FIG. 4 illustrates a data transfer process in DLP mode by stations according to the present invention.

FIG. 4 illustrates a data transfer process in DLP mode 2 by stations according to the present invention. The present invention generally involves operations using three DLP modes. Mode 1 is a scheme which is proposed by the 802.11e group and is a scheme in which a station in a BSS is connected to a direct link, and the station contends with other stations in the BSS and then shares one channel. Depending on a mode selected by a station using a DLP, DLP mode 2 or DLP mode 3 using an independent channel is employed. In DLP mode 2, a station connects with the direct link using the DLP and contends with other stations in the BSS. If the station loses the contention, it does not stand by for a NAV period but increases a transfer rate at a DLP station using a DLP channel. If the station is requested to communicate with other stations in the BSS rather than to transmit data to the DLP station, it communicates with other stations using a primary channel according to DCF rules. Even on the side of other stations, this will reduce chances for DLP stations to use the primary channel and thus provide the stations in the BSS with more opportunities to use the channel in the BSS. Meanwhile, if a DLP station wins the contention, the station does not use the primary channel but communicates using the DLP channel. Other stations contend again with one another and comply with a basic contention algorithm of the DCF. FIG. 4 illustrates the use of mode 2 and both cases where the station wins and loses channel contention. Advantages of the use of mode 2 include providing communications between the DLP stations and the general stations in the BSS, making use of the advantages of the DLP, and enhancing the overall channel efficiency in the BSS.

Figure 5:
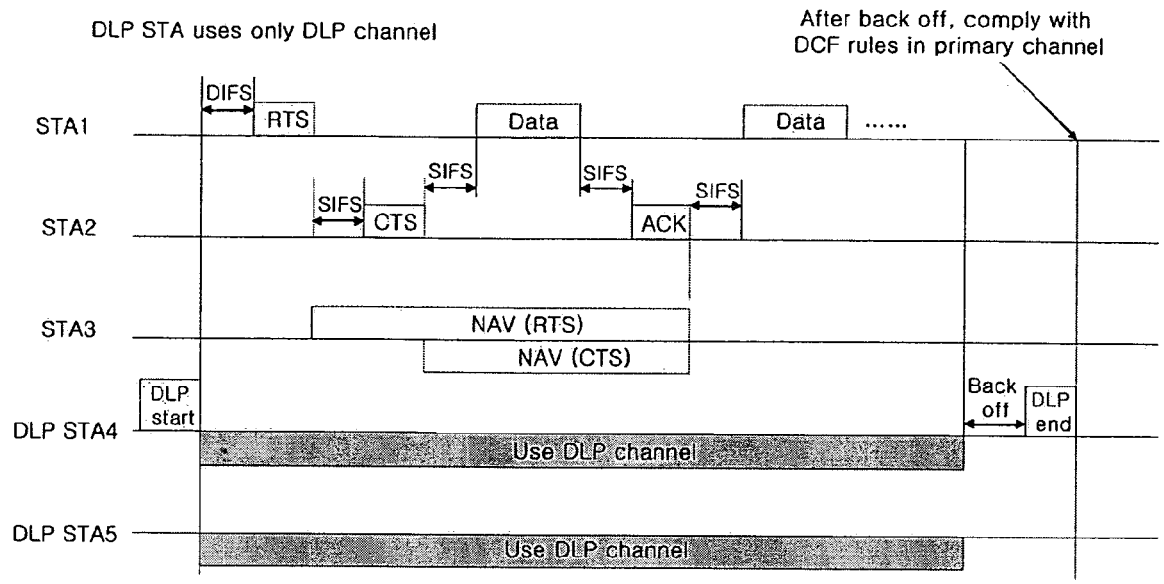
FIG. 5 illustrates a data transfer process in DLP mode 3 by stations according to the present invention.

FIG. 5 illustrates a data transfer process in DLP mode 3 by stations according to the present invention. DLP mode 3 may be used when streaming is needed or when the maximum transfer rate is required. After a direct link is established, a station is allocated a DLP channel by an AP, separately from communications through the primary channel, so that the station can use an independent channel. As shown in FIG. 5, in order to use the DLP channel, a DLP station informs the AP and other stations in the BSS that it uses another channel by broadcasting the DLP mode and the DLP channel allocated by the AP in a DLP start frame. The AP controls DLP stations as sleeping stations. When the DLP station terminates the DLP and performs switching to the primary channel in the BSS, it acquires a channel after the channel is switched and a backoff period passes, and then informs the other stations that the direct link has been terminated using a DLP end frame. DLP mode 3 is particularly effective in the case of transmission of multimedia in which QoS must be guaranteed, as in a case where streaming between designated stations should be performed, excluding communications with other stations.

Figure 1:
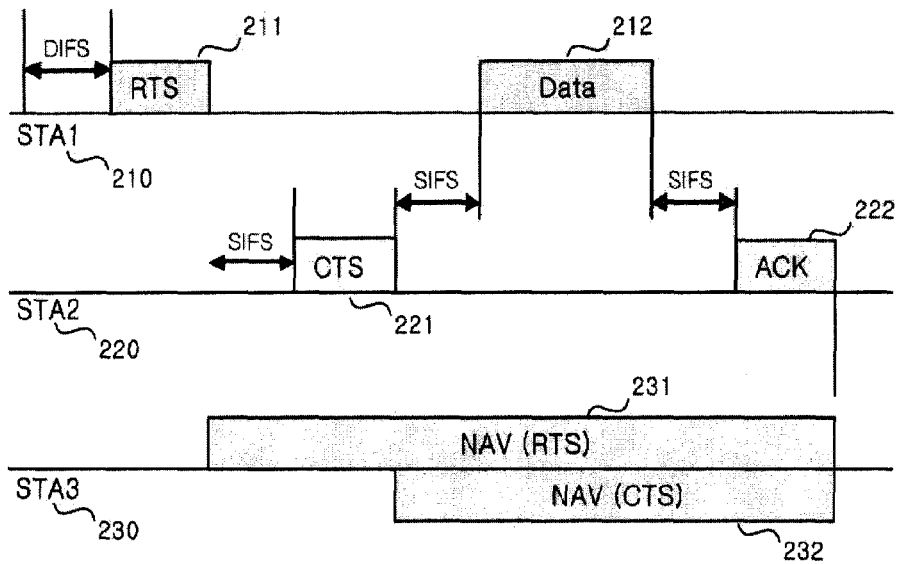
FIG. 1 illustrates data transfer processes in a CSMA/CA mode in which stations share a single channel.
Figure 2:
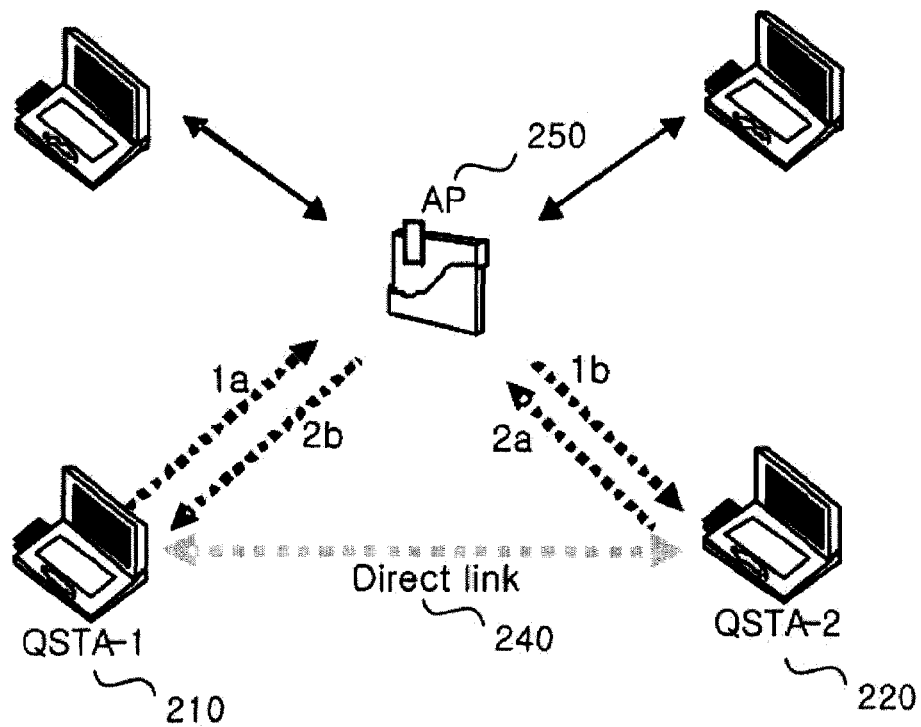
FIG. 2 illustrates a 4-handshake process of a DLP in the related art.
Figure 3:
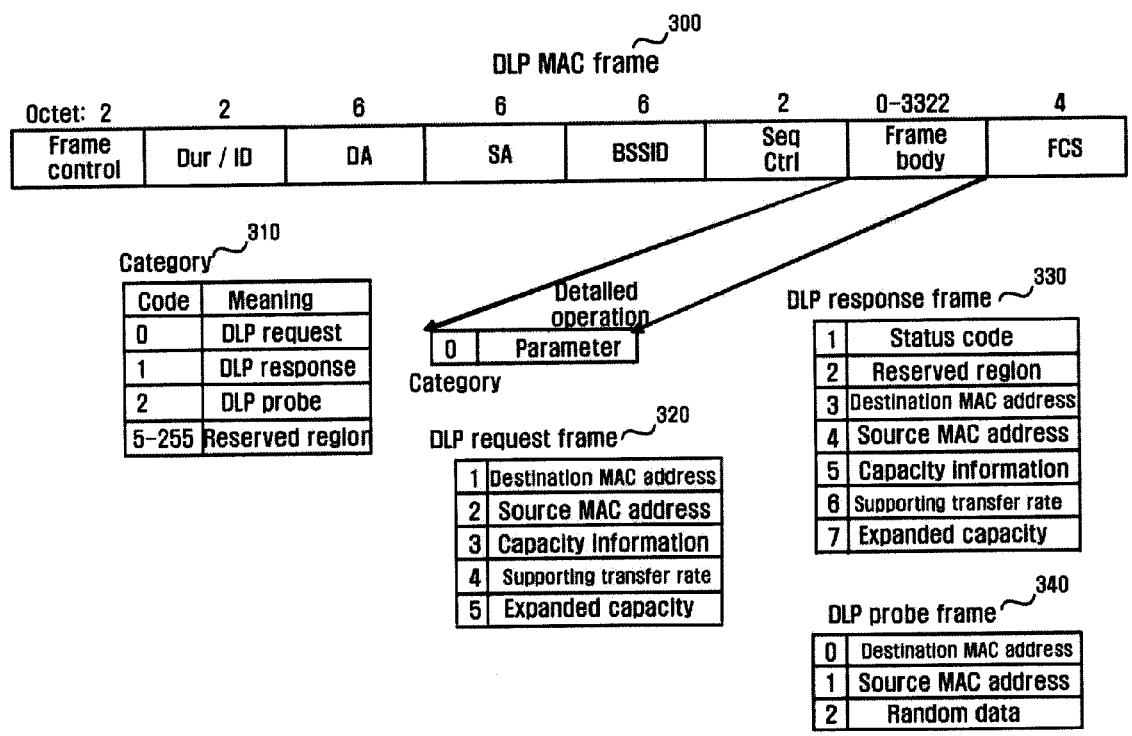
FIG. 3 shows the structure of a DLP frame in the related art.
Figure 6:
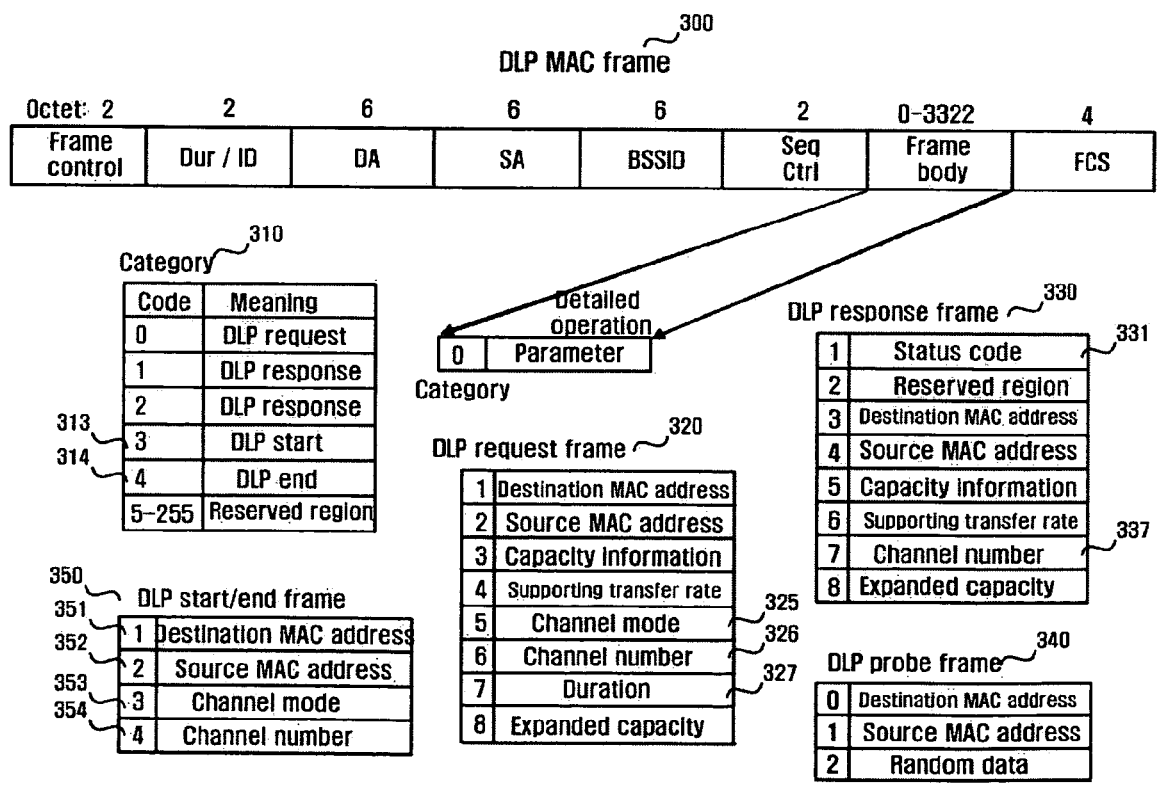
FIG. 6 shows the structure of a DLP frame according to the present invention.

FIG. 6 shows the structure of a DLP frame according to the present invention. As compared with the structure of a DLP frame in the related art shown in FIG. 3, the external and general structure of the DLP frame shown in FIG. 6 is the same as shown in FIG. 3. A MAC header section consists of a frame control field, a duration/ID (Dur/ID) field, a destination address (DA) field, a source address (SA) field, a basic service set ID (BSSID) field, and a sequence control (Seq Ctrl) field. A subsequent frame body section whose length is variable contains information on a frame category and variables. Codes representing various kinds of frames to be described later are written in the category. Field values contained in various frames are stored as the variables. Further, a frame check sequence (FCS) field has IEEE 32-bit CRC information.

However, the kind of category contained in the frame body and the constituent fields of the DLP frame in FIG. 6 are different from those shown in FIG. 3. The category will be first described. It can be seen that a 'DLP start' code 313 indicating the DLP start frame and a 'DLP end' code 314 indicating the DLP end frame have been added to the category. In the DLP start and end frames 350, field formats of both frames are identical with each other. The DLP start and end frames 350 consist of a MAC address of a destination station (receiving station) 351, a MAC address of a source station (sending station) 352, a DLP channel mode 353 for determining a mode to be selected among the three modes proposed by the present invention, and a channel number 354 that enables DLP communications.

The format of a DLP probe frame 340 is the same as a conventional one. This frame serves to check whether a direct link connection is operating well. This frame is not indispensable but optional.

A DLP request frame 320 is a frame by which a sending station requests a direct link before it transmits/receives data to/from a receiving station. If the DLP request frame is sent to the AP, the AP forwards it to the receiving station. Fields added to a conventional DLP request frame are a channel mode field 325 that determines which of the modes proposed by the present invention is to be used, a channel number field 326 that determines a channel through which communications will be made using the direct link, and a duration field 327 that determines the duration of a connection state established through the direct link in either case of mode 2 or 3. When the sending station first transmits the DLP request frame to the AP, it cannot know the number of an available channel. The channel number is thus specified as a 'NULL' value. Then, the AP finds out the number of an available channel and then writes the value of the channel number in the channel number field 326 before forwarding the DLP request frame to the receiving station.

A DLP response frame 330 is a frame that is forwarded to the sending station by the AP when the receiving station receives the DLP request frame, determines whether to join the DLP direct link, and then transmits the DLP response to the AP. The determination results are shown in a status code field 331. A field added to a conventional DLP response frame is a channel number field 337 containing a channel number allocated by the AP to the channel number field 326 of the DLP request frame. Then, the sending station can know the channel number to be connected through the direct link by referring to the channel number field 337 of the DLP response frame. Accordingly, both of the stations can communicate with each other through one channel.

Figure 7:
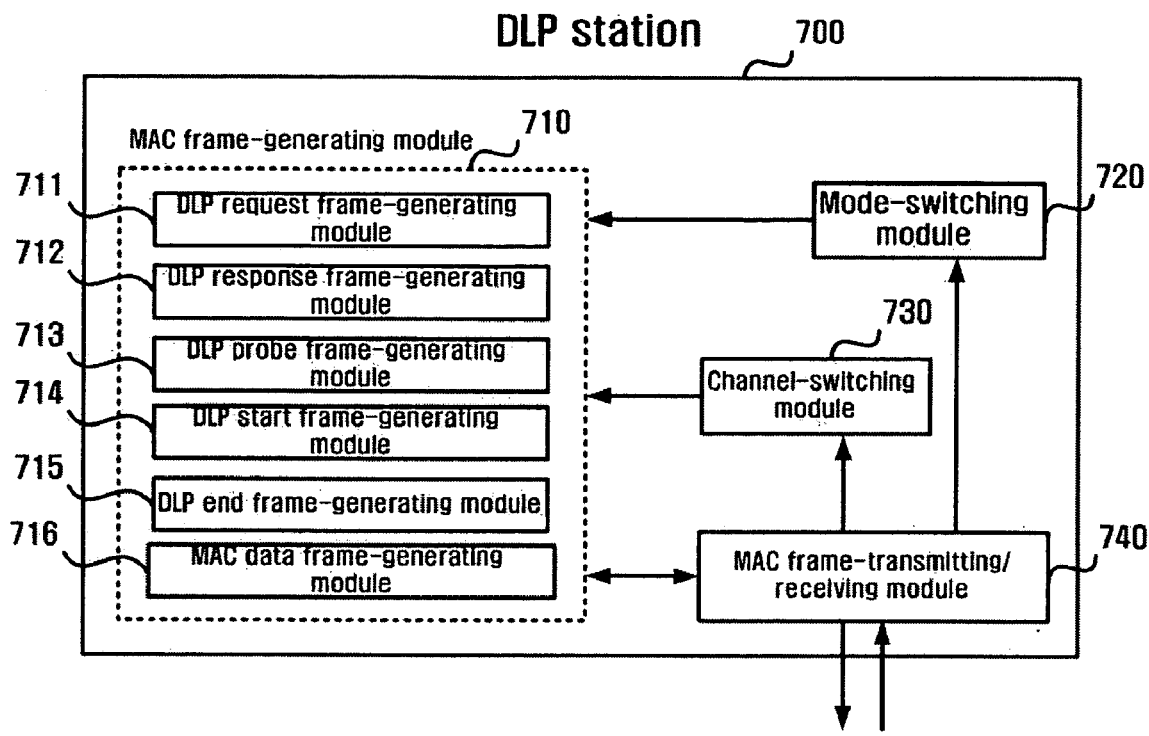
FIG. 7 is a block diagram showing the configuration of a DLP station for implementing the present invention.

FIG. 7 is a block diagram showing the configuration of a DLP station for implementing the present invention. As shown in FIG. 7, the DLP station 700 comprises a MAC frame-generating module 710, a mode-switching module 720, a channel-switching module 730, and a MAC frame-transmitting/receiving module 740.

The MAC frame-generating module 710 may comprise a DLP request frame-generating module 711, a DLP response frame-generating module 712, a DLP probe frame-generating module 713, a DLP start frame-generating module 714, a DLP end frame-generating module 715, and a MAC data frame-generating module 716. The DLP request frame-generating module 711 generates the DLP request frame 320 containing information on addresses of the sending and receiving stations, capacity, data transfer rate, expanded capacity and the like, as shown in FIG. 6. Furthermore, the DLP response frame-generating module 712 generates the DLP response frame 330 containing information on status codes, addresses of the sending and receiving stations, capacity, data transfer rate, channel number, expanded capacity and the like. In addition, the DLP probe frame-generating module 713 generates the DLP probe frame 340 for checking whether the direct link connection is operating well. Meanwhile, the DLP start frame-generating module 714 generates the DLP start frame 350 by which addresses of the sending and the receiving stations, a channel mode and a channel number are broadcast if the receiving station is a DLP station after winning a contention with existing channels, which informs other stations and the AP in the BSS that a DLP has started and thus another channel may be used depending on the channel mode. Moreover, the DLP end frame-generating module 715 generates the DLP end frame 350 which functions to inform a counterpart station and all other stations using the DLP in DLP mode 3 that the DLP is intended to be terminated. In addition, the MAC data frame-generating module 716 generates a data frame containing general MAC data.

When one of the modes proposed by the present invention has been selected and the selected mode is to be switched to another mode, the mode-switching module 720 functions to perform the mode switching by writing a desired mode number into the channel mode field 325 of the DLP request frame 320.

When the primary channel is switched to a channel allocated by the AP for direct link communications or vice versa, the channel-switching module 730 functions to perform the channel switching by writing a new channel number into the channel number field 326 of the DLP request frame 320.

The MAC frame-transmitting/receiving module 740 functions to transmit/receive the DLP request frame 320, the DLP response frame 330, the DLP probe frame 340, the DLP start frame 350 and the DLP end frame 350 in the DLP station.

Figure 8:
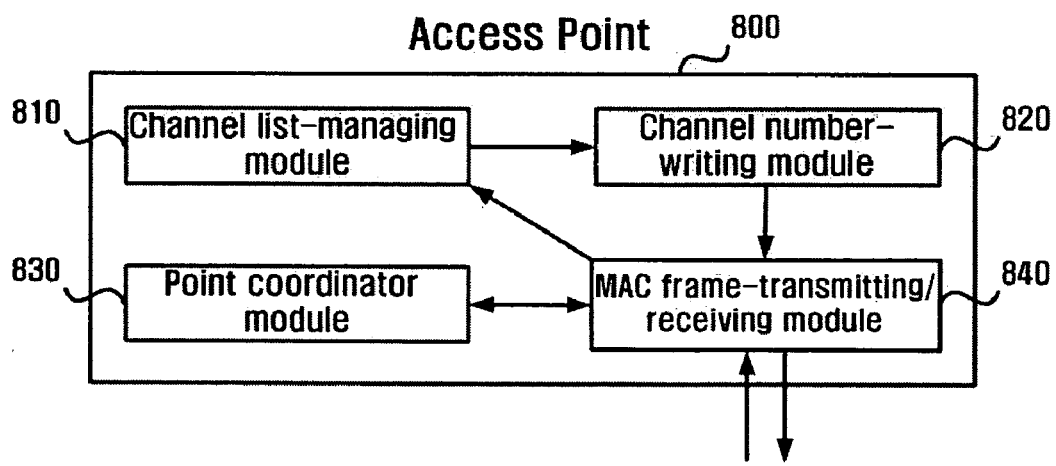
FIG. 8 is a block diagram showing the configuration of an access point for implementing the present invention.

FIG. 8 is a block diagram showing the configuration of an AP for implementing the present invention. As shown in FIG. 8, the AP comprises a channel list-managing module 810, a channel number-writing module 820, a point coordinator module 830 and a MAC frame-transmitting/receiving module 840.

The channel list-managing module 810 functions to manage a list of available channels through periodical analysis of channel conditions and to distribute the list. Since channels are limited resources, the AP cannot distribute the channels infinitely. The following table shows an example of a list of available channels existing in the AP. The channel list-managing module 810 can manage a list of channels used in the BSS, including the primary channel, according to respective channel numbers. The AP manages/distributes available channels in the channel list, excluding the primary channel used in the BSS, according to the order of less noise based on received signal strength indication (RSSI).

TABLE

| Channel Number | Completion Time | Station List | RSSI |
|---|---|---|---|
| CH1 | Tch1 | S1, S2 | 10 |
| ... | ... | ... | ... |
| CHn | Tchn | S3, S4 | 5 |

The channel number-writing module 820 functions to check whether there are any distributable DLP channels, upon receipt of a DLP request frame via the MAC frame-transmitting/receiving module 740, and to write the distributable DLP channel in the DLP request frame.

If DLP stations use other DLP channels in mode 3, the point coordinator module 830 functions to consider the DLP stations as sleeping stations after the DLP start frame has been broadcast and perform buffering/management of a frame that needs to be sent to the DLP stations, if any. Further, if the duration of mode 3 is terminated and the DLP end frame is broadcast, the point coordinator module 830 considers the sleeping stations as also having awaken again and performs the management thereof.

The MAC frame-transmitting/receiving module 840 functions to forward a DLP request frame received from a DLP sending station to a DLP receiving station and a DLP response frame received from the DLP receiving station to the DLP sending station.

Figure 9:
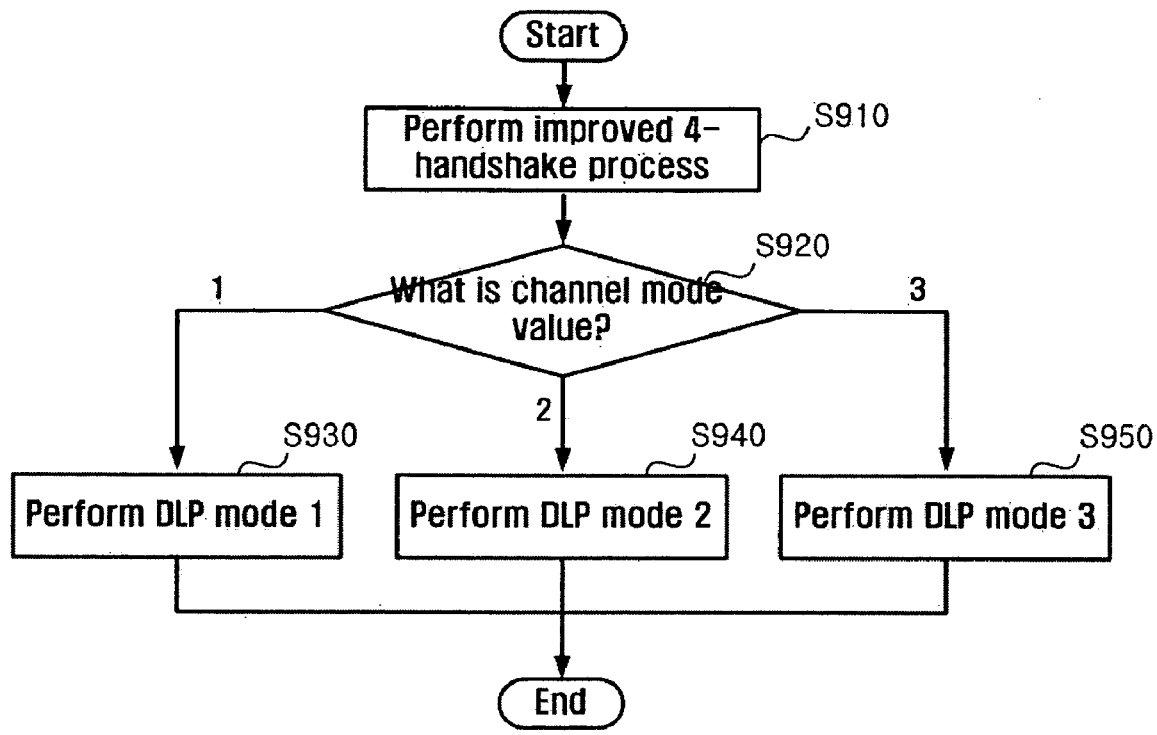
FIG. 9 is a flowchart illustrating the entire steps of a method according to the present invention.

FIG. 9 is a flowchart illustrating the execution steps of a method according to the present invention. An improved 4-handshake process proposed by the present invention is first performed (S910). The next step is then determined according to a DLP channel mode and a channel number that are determined through the 4-handshake process. At this time, if the value of the channel mode is 1, DLP mode 1 is performed (S930). If its value is 2, DLP mode 2 is performed (S940). If its value is 3, DLP mode 3 is performed (S950).

Figure 10:
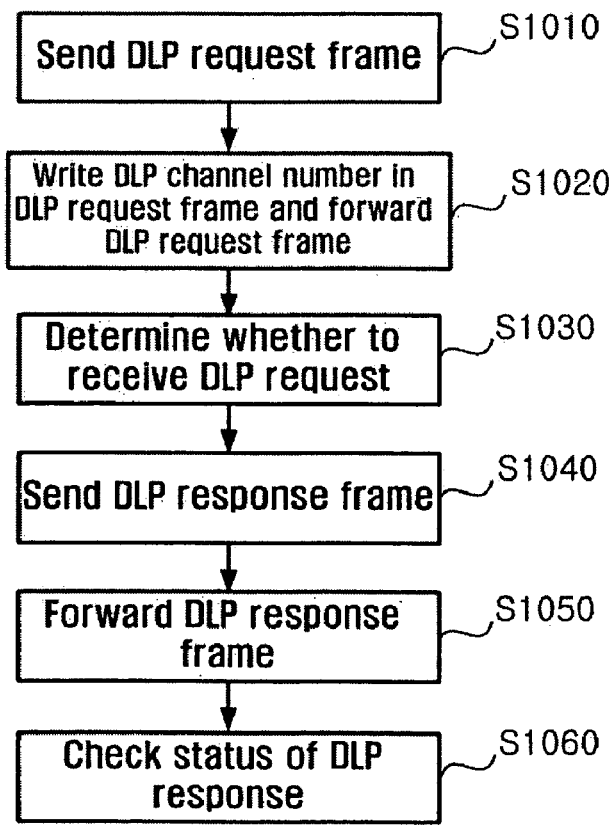
FIG. 10 is a flowchart illustrating an improved 4-handshake process according to the present invention.

FIG. 10 is a flowchart illustrating the improved 4-handshake process according to the present invention. If there is a station that intends to transmit data through a direct link, a DLP sending station constructs a DLP request frame and then transmits the DLP request frame to an AP (S1010). The AP periodically scans available channels and then manages a list of the available channels. When distributing the available channels, the AP distributes the other available channels except channels that are currently being used in a BSS. The AP writes one channel number of the available channels into the channel number field of the DLP request frame and then forwards the DLP request frame to a DLP receiving station (S1020). The DLP receiving station then determines whether to receive the DLP request (S1030). Next, the DLP receiving station sends a DLP response frame including the determination results to the AP (S1040). The AP forwards the DLP response frame to the DLP sending station (S1050). Finally, the DLP sending station checks the status of the DLP response, i.e., whether the DLP receiving station has rejected or accepted the direct link, based on the received DLP response frame (S1060).

Figure 11:
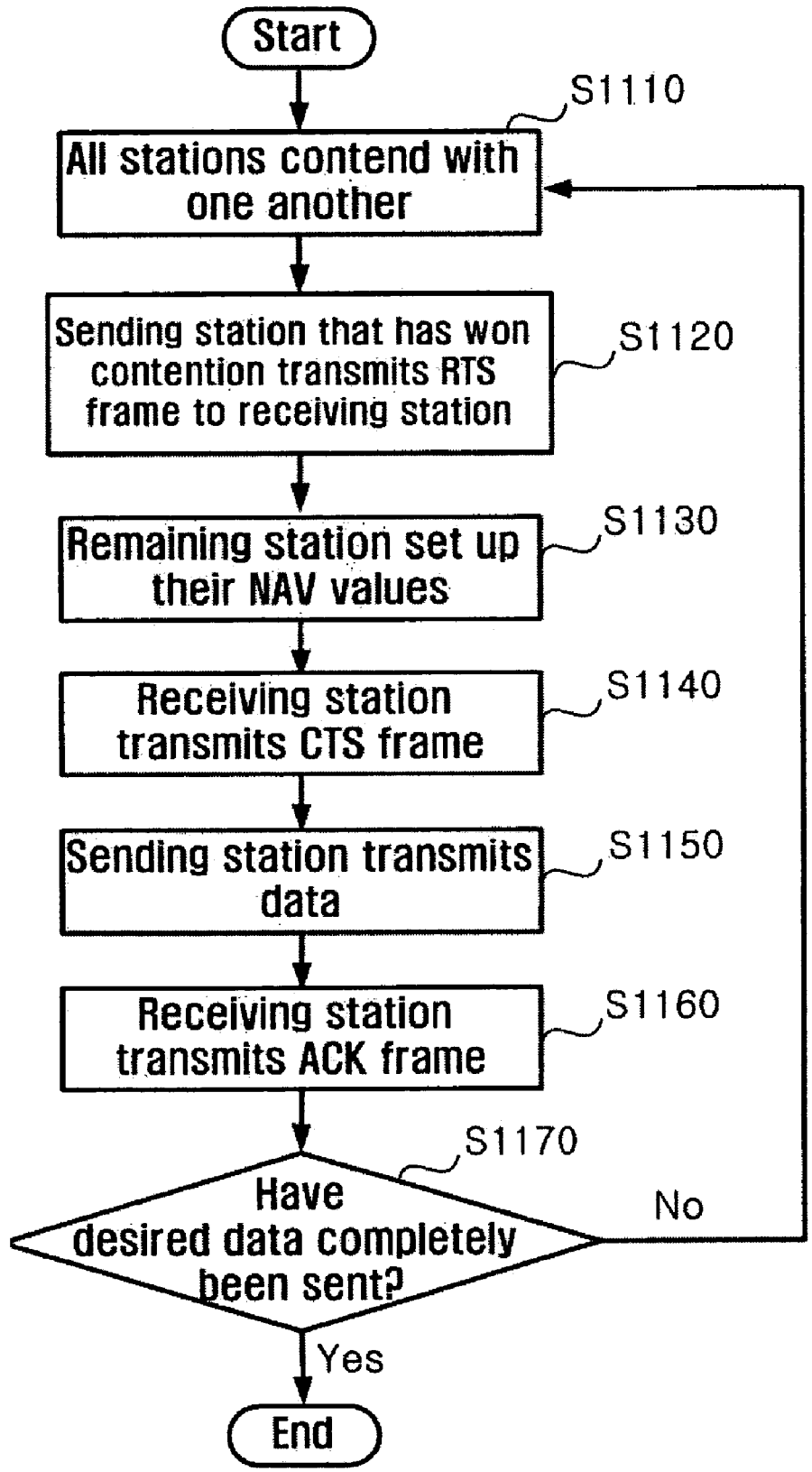
FIG. 11 is a flowchart specifically illustrating a process of mode 1.

FIG. 11 is a flowchart specifically illustrating a process of mode 1. If the DLP sending station broadcasts that it is in mode 1, the process of mode 1 starts. In mode 1, a plurality of stations in a BSS contend with one another and share one channel after being connected through a direct link. In other words, this mode complies with a data transmitting/receiving process of a conventional CSMA/CA contention scheme equally regardless of whether a station is a DLP station or a general station. However, if the DLP sending station wins the channel contention, data transmission/reception is made between DLP stations via the direct link.

Therefore, all stations contend with one another (S1110). A sending station that has won the contention transmits a RTS frame to a receiving station (S1120). The remaining stations then set up their NAV values (S1130) and the receiving station transmits a CTS frame to the sending station (S1140). The sending station sends data to the receiving station (S1150). The receiving station transmits an ACK frame to the sending station (S1160). The above process is repeated until desired data are completely transmitted (S1170).

Figure 12:
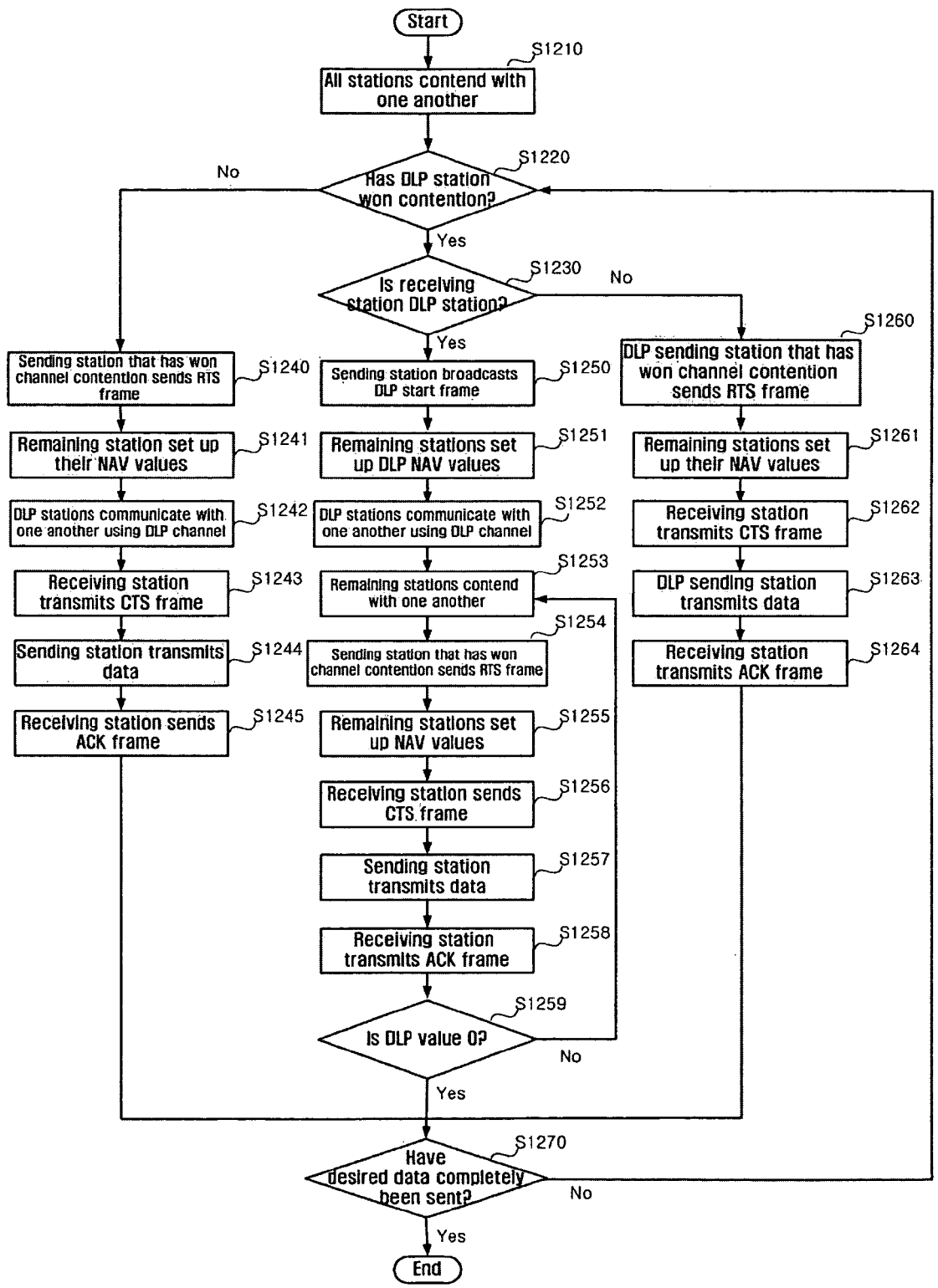
FIG. 12 is a flowchart specifically illustrating a process of mode 2.

FIG. 12 is a flowchart specifically illustrating a process of mode 2. If a DLP sending station broadcasts that it is in mode 2, the process of mode 2 starts. All stations contend with one another to acquire a channel. The process is comprised of a case where the DLP station has won primary channel contention and a case where the DLP station has lost primary channel contention. When the DLP station has won the channel contention, a receiving station may be a DLP station connected through a direct link or a general station that is not connected through the direct link. For this reason, even when the DLP station has won channel contention, the process depends on whether the receiving station is the DLP station or not.

First, when the DLP station has lost the primary channel contention, if a sending station that has won the channel contention sends a RTS frame to a receiving station (S1240), the remaining stations except the DLP station set up their NAV values (S1241). For the period during which the NAV value is set up, the DLP stations communicate with one another using a DLP channel (S1242). The receiving station transmits a CTS frame to the sending station (S1243). Then, the sending station transmits data to the receiving station (S1244) and the receiving station sends an ACK frame to the sending station (S1245).

Second, when the DLP station has won the primary channel contention and the receiving station is a DLP station, the DLP sending station first broadcasts a DLP start frame in order to inform the remaining stations that DLP communication has started (S1250). The remaining stations are established so that communications cannot be made using the DLP, by setting up NAV values (hereinafter, referred to as 'DLP NAV') during the period that is reserved for communications by the DLP station (S1251). The DLP stations communicate with one another using a DLP channel (S1252). Meanwhile, since the primary channel is yet empty, the remaining stations can contend with one another for the channel (S1253). As a result of the contention, a sending station that has won the channel contention sends a RTS frame to a receiving station (S1254). The remaining stations except the DLP sending/receiving stations and the sending/receiving stations established through the channel contention set up their NAV values (S1255). Thereafter, the receiving station sends a CTS frame to the sending station (S1256) and the sending station accordingly sends data to the receiving station (S1257). Then, the receiving station transmits an ACK frame to the sending station (S1258). During the period where the DLP NAV is set up, the above process (S1253 to S1258) is repeated (S1259).

Finally, when a DLP station has won primary channel contention and a receiving station is not a DLP station, the process is the same as in the channel contention scheme of the general station other than the DLP station (S1260 to S1264).

If desired data are completely transmitted in the last step of the three cases, the process is terminated. If desired data are not completely transmitted, the process is repeated from the first step in which all the stations contend with one another for a channel (S1270).

Figure 13:
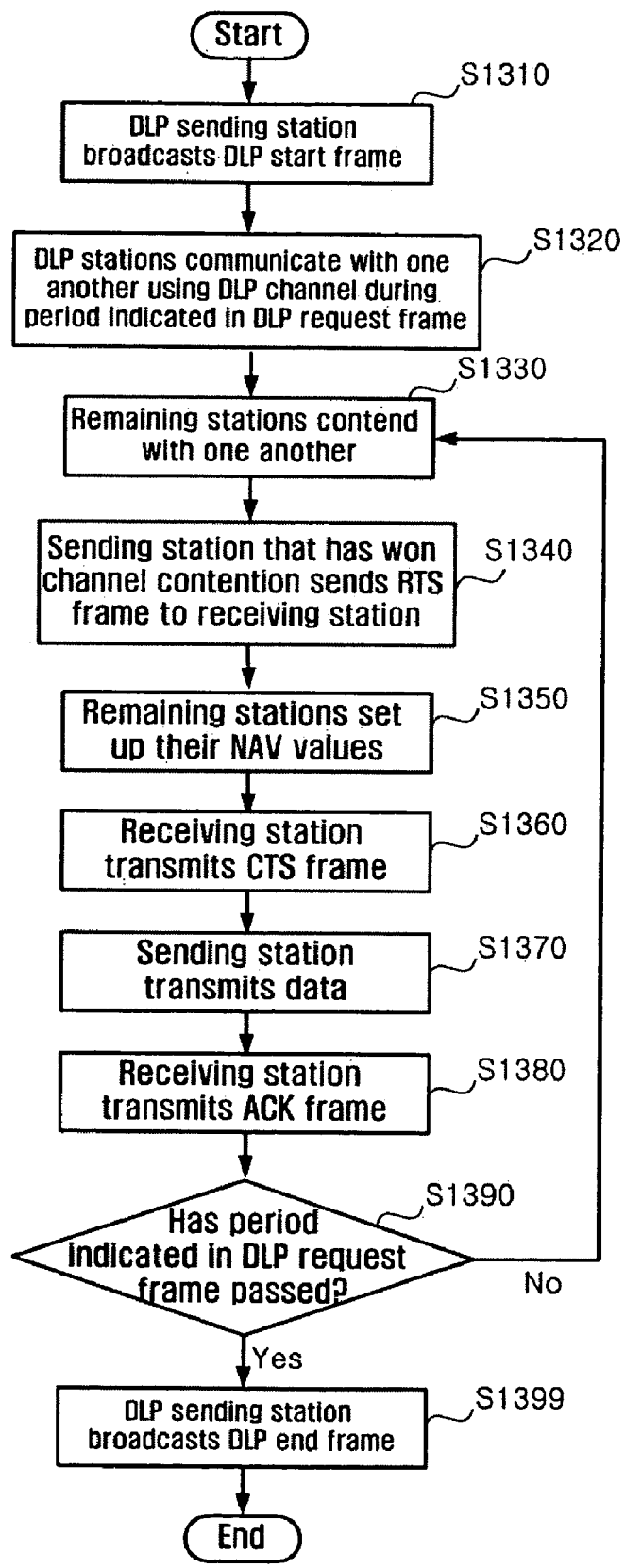
FIG. 13 is a flowchart specifically illustrating a process of mode 3.

FIG. 13 is a flowchart specifically illustrating a process of mode 3. If a DLP sending station broadcasts that it is in mode 3, the process of mode 3 starts. The DLP sending station first broadcasts a DLP start frame informing the start of the DLP in order to inform an AP and the remaining stations in a BSS that DLP stations use another channel (S1310). During the duration indicated in a duration field (327 in FIG. 6) of a DLP request frame, the DLP stations transmit/receive data to/from one another using a DLP channel (S1320). An AP manages the DLP stations by considering them as sleeping stations, and the DLP stations operate as independent virtual BSSs. Therefore, since the remaining stations do not recognize the DLP stations, they contend with one another for a channel (S1330). A sending station that has won the channel contention sends a RTS frame to a receiving station (S1340). The remaining stations, except the DLP sending/receiving stations and the sending/receiving stations established through the channel contention, set up their NAV values (S1350). The receiving station sends a CTS frame to the sending station (S1360). The sending station then transmits data to the receiving station (S1370). Subsequently, the receiving station sends an ACK frame (S1380). The above process is repeated until the duration indicated in the duration field passes (S1390). After the duration has passed, the DLP sending station broadcasts an end frame informing the remaining stations that the DLP communication procedure has been terminated (S1399).

According to the present invention described above, by determining a DLP mode for DLP stations according to a medium to be transferred, QoS of the DLP stations can be secured and channel contention in a BSS can be reduced even on the side of stations that do not use a DLP. Therefore, there is an advantage in that it is possible to enhance overall throughput.

Furthermore, according to the present invention, there is an advantage in that it is possible to maintain compatibility with stations using a conventional DCF in a wireless mobile environment, and in case of transmission of various multimedia data particularly, streaming, reliable transfer of data can be obtained in a P2P transfer topology.

Although the present invention has been described in detail in connection with the preferred embodiments of the present invention, it will be apparent to those skilled in the art that various changes and modifications can be made thereto without departing from the spirit and scope of the invention. Thus, simple modifications to the embodiment of the present invention fall within the scope of the present invention.

What is claimed is:

1. A direct link protocol (DLP) station, comprising:
   a channel-switching module which switches a channel by writing a new channel number in a DLP request frame;
   a mode-switching module which switches a DLP mode by writing a new mode number in the DLP request frame in which the new channel number is written by the channel-switching module; and
   a media access control (MAC) frame-generating module for generating various MAC frames including the DLP request frame in which the new channel number and the new mode number are written,
   wherein the MAC frame-generating module comprises:
   a DLP request frame-generating module for generating the DLP request frame;
   a DLP response frame-generating module for generating a DLP response frame in response to the DLP request frame; and
   a MAC data frame-generating module for generating a MAC frame containing data to be sent to said other stations.

2. The DLP station as claimed in claim 1, further comprising a MAC frame-transmitting/receiving module for transmitting the various frames generated by the MAC frame-generating module and receiving frames from one of other stations and an access point.

3. The DLP station as claimed in claim 1, wherein the MAC frame-generating module further comprises:
   a DLP start frame-generating module for generating a DLP start frame which informs said other stations that a DLP has started, thereby causing another channel to be used depending on a channel mode; and
   a DLP end frame-generating module for generating a DLP end frame which informs said other stations that the DLP is intended to be terminated.

4. A wireless network system for enhancing throughput using a direct link protocol (DLP) and multiple channels, comprising:
   a plurality of DLP stations and an access point,
   wherein each of the plurality of DLP stations comprises:
   a channel-switching module which switches a channel by writing a new channel number in a DLP request frame;

a mode-switching module which switches a DLP mode by writing a new mode number in the DLP request frame in which the new channel number is written by the channel-switching module; and a media access control (MAC) frame-generating module which generates various MAC frames including the DLP request frame in which the new channel number and the new mode number are written, wherein the MAC frame-generating module comprises:

a DLP request frame-generating module for generating the DLP request frame;

a DLP response frame-generating module for generating a DLP response frame in response to the DLP request frame; and a MAC data frame-generating module for generating a MAC frame containing data to be sent to at least one of the DLP stations.

5. The wireless network system as claimed in claim 4, wherein each DLP station further comprises a MAC frame-transmitting/receiving module for transmitting various frames generated by the MAC frame-generating module and receiving frames from one of other stations and the access point.

6. The wireless network system as claimed in claim 4, wherein the MAC frame-generating module further comprises:

a DLP start frame-generating module for generating a DLP start frame which informs the DLP stations that the DLP has started, thereby causing another channel to be used depending on a channel mode; and a DLP end frame-generating module for generating a DLP end frame which informs the DLP stations that the DLP is intended to be terminated.

7. The wireless network system as claimed in claim 4, wherein the access point comprises:

a channel list-managing module for managing and distributing a list of available channels through periodical analysis of channel conditions;

a channel number-writing module for checking whether there is an available DLP channel from the channel list and writing an available channel in the DLP request frame; and a point coordinator module for performing buffering and management of a frame that is required to be sent to sleeping stations.

8. The wireless network system as claimed in claim 7, wherein the access point further comprises a MAC frame-transmitting/receiving module for forwarding one of a received DLP request frame and a DLP response frame to other stations.

* * * * *